Oct. 13, 1936.  G. W. BAILEY  2,057,288
EYEGLASSES
Filed Jan. 3, 1936
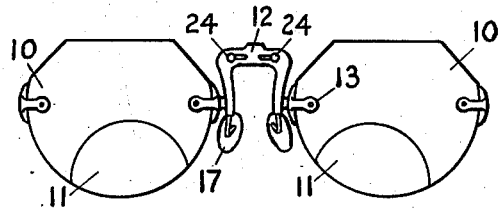
FIG. 1.
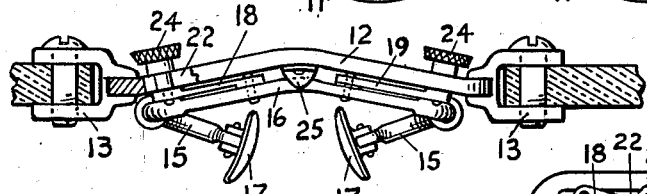
FIG. 3.
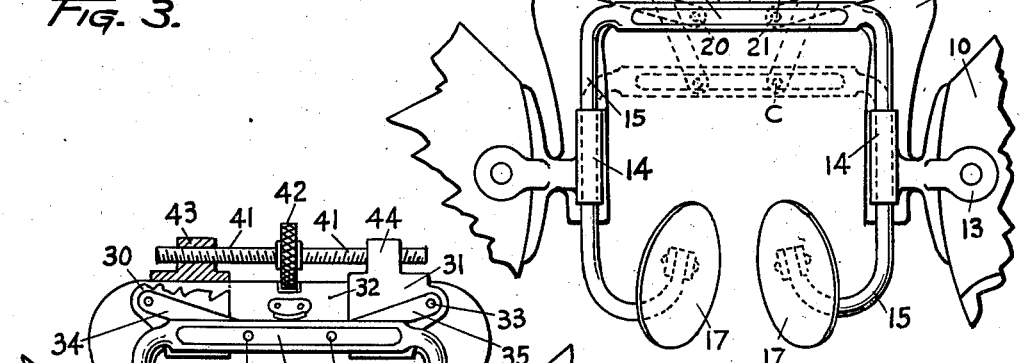
FIG. 2.
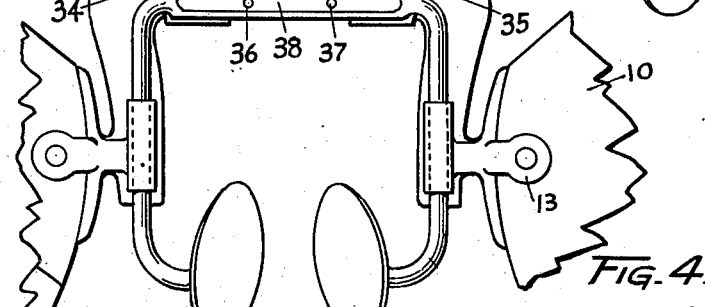
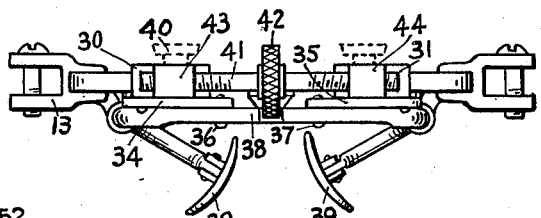
FIG. 5.
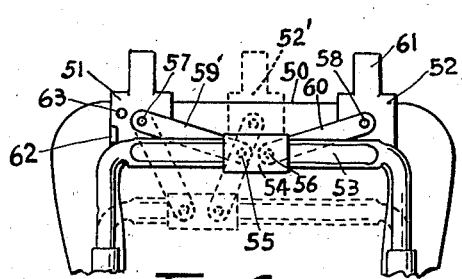
FIG. 6.
GEORGE W. BAILEY INVENTOR.
BY Louis Illmer
ATTORNEY.

Patented Oct. 13, 1936

2,057,288

UNITED STATES PATENT OFFICE 2,057,288

EYEGLASSES

George W. Bailey, Cortland, N. Y.

Application January 3, 1936, Serial No. 57,382

10 Claims. (Cl. 88—49)

This invention relates to multifocal eyeglasses comprising a pair of lenses that may be mounted in a novel manner by an interconnecting metallic rim frame or the like rimless bridge means. The present improvements are primarily concerned with a simplified and compactly disposed bridge actuating device of the manipulative type whereby both lenses may be conveniently shifted from a centralized control point into alternative raised or lowered positions with respect to the wearer's normal line of vision.

My sectional lens frame is preferably of the two-part extensible type of which one component includes a semi-rigid, relatively flat bridge piece that may be given a decorative U-shaped configuration. The respective depending legs thereof each fixedly mount lens receiving rim means or the like eyelet strap that marginally engages a lens in the conventional fashion.

The central arch region of this bridge piece may be kept flat in profile so as to virtually lie in a common plane with the lens faces. Masked behind such vertically disposed bridge piece in substantial registry with its U-shaped contour, there is superimposed a similarly shaped yoke or frame component of which the respective terminals are equipped with twin nose pads. These opposed pads are disposed to bear evenly inward upon the sides of the wearer's nose rather than downwardly upon its ridge so as to afford a more comfortable lens support that shall be free from irritating inflammation or other contusions.

The medial region of such yoke may be likewise flattened to impart a predetermined degree of lateral flexibility between the mounted lenses. The respective terminal regions of said yoke are slidably mounted in a pair of tubular guideways respectively affixed to a corresponding leg end of my bridge piece to allow of shifting the lenses in unison with respect to said twin pads while the eyeglasses are operatively positioned upon the wearer's nose. Retaining means are provided for releasably upholding the raised bridge component when shifted into its extended position.

The present innovations in certain respects follow the teachings of my copending application Serial No. 19,975 filed May 6, 1935, of which the instant disclosure represents a continuation in part. As a preferred characteristic of either embodiment, the lenses are made to descend toward my complementary nose pads when the bridge piece is pressed in a downward direction. Togglelike link means of novel construction herein provide for lifting the bridge piece when it is desired to return the lenses into raised position.

Although other devices also obviate the necessity for assuming an unnatural head or eye position when resorting to either the distant or the near vision field of bifocal lenses, my objective is to provide for an improved sectional lens frame of the shiftable type that shall be operable in an obvious manner without requiring extensive changes in the prevailing frame structure when designed to utilize twin nose pads; also to eliminate the need for springs and to restrict all required supplementary members to part that may be readily assembled and shall not appear cumbersome or otherwise tend to detract from the ready salability of eyeglasses when so equipped.

Fastidious wearers naturally resent any defacement and an outstanding aim of the present invention is to contrive a neat inconspicuous auxiliary of the character indicated that shall be thoroughly practicable for general bifocal use and to incorporate the required bridge shifting means in a simple manner without unduly raising its fabrication cost in comparison with a conventional nonextensible framework. Included herein are also other structural aspects intended to carry out the cited purposes, all of which details will hereinafter be more fully defined. Reference is had to the accompanying one sheet drawing which is illustrative of several alternative embodiments of my invention, and in which drawing:

Fig. 1 presents a front elevational assembly showing a pair of glasses equipped with my vertically adjustable bridge means.

Fig. 2 is an enlarged rear view of the Fig. 1 disclosure in which the lenses are lowered with respect to their twin nose pads, and Fig. 3 is a top view thereof.

Fig. 4 is similar to Fig. 2 but illustrates a modified bridge actuating linkage, while Fig. 5 depicts a top view of the Fig. 4 assembly.

Fig. 6 shows a fragmental view of still another toggle link modification.

Referring in detail to the preferred Figs. 1 to 3 embodiment, this comprises a pair of bifocal eyeglasses of which the upper section 10 usually serves as the distance lens and the lower section 11 serves as the reading lens. Temple bars may be pivotally attached to the outermost rim portion of each such lens by suitable eyelets or the like. The respective innermost rim portions of such lenses may each be apertured for securement to a relatively flat bridge piece 12 that is preferably stamped up from sheet metal. The elongated crown region 12A of such U-shaped bridge member is kept relatively high to adequately clear the nose ridge and which laterally resilient arch element may be thrown forwardly in the bowed fashion indicated in Fig. 3.

In addition to the outstanding inner eyelet or equivalent lens receiving means 13, each leg end of said bridge piece also fixedly carries a tubular guide barrel such as 14 of which the respective vertical axes substantially align with the lens faces. Such complementary guide means may either be welded in place or formed integrally to slidably receive the legs of my lens actuating yoke member 15 in laterally spaced relation to the bridge piece. Said yoke component may be fabricated from high grade wire which is here given a U-shaped contour conforming to the bridge piece so that the yoke member when raised into its full-lined Fig. 2 position, may be substantially concealed therebehind. The medial region of the yoke 15 may be flattened at 16 in alignment with the crown profile of the bridge to impart a limited combined lateral yield to the pair of lenses mounted on said inner eyelets.

Each yoke terminal region may be slidably embraced within a separate guide barrel. The lower end of each such yoke terminal may be apertured to tiltably carry one of the twin nose pads thereon such as 17, the apertured pintle receiving yoke ends being tapered somewhat and may be bent up after having been entered through their respective guide barrels. These oppositely arranged pads adjustably seat upon the sides of the wearer's nose in the now conventional fashion. The present improvements provide for an actuating mechanism adapted to be manipulated from a centralized control and one capable of simultaneously raising or lowering both lenses with respect to such companion pads while the eyeglasses are being worn in operative position. The depending yoke ends being shiftably guided in the barrels 14, prevent separation of the complementary nose pads and allow the bridge piece to be moved vertically with respect to said pads when in operative position.

The means whereby the present bridge piece may be positively shifted relative to said yoke pads without the use of return spring means, preferably reside in a pair of reversely inclined togglelike links such as 18 and 19 that may be interposed between the bridge crown 12A and the flattened yoke region 16, although a single link may be resorted to. To this end, said yoke region may be provided with one or more pintle receiving apertures such as 20 and 21 and to which pintle or pintles the respective convergent or inner ends of such pair of links are fulcrumed. The respective divergent or outer link ends are freely directed in substantially aligned guide slots 22 and 23 that may be spacedly pierced in tandem through the bridge crown. An outstanding knurled finger piece such as 24 may be provided with a fulcrum shank that slidably extends rearwardly through one such slot in crosshead fashion and is riveted to an outer link end as shown in Fig. 3. When the bridge crown is bowed forwardly into an obtuse nose shape, the medial yoke region 16 is given a like formation so that the corresponding pintle axes of each link may be kept in parallelism.

An overhanging stop lug 25 may be secured to the rear of the bridge crown to limit collapse of my frame members. When the bridge piece 12 is lowered as indicated by full lines in Fig. 2, said yoke region will abut this lug. For convenience of reference, certain critical positions of the link turning points have been identified by letters. Between collapsed and extended frame positions, each inner link end will be guided vertically by the yoke between the dotted and full-lined yoke positions C and A. When collapsed, each outer link end will be spread apart and carried into the position B, whereas when the frame is extended, each finger piece will be drawn together and lodged in the position D. The use of balanced double links disposed lengthwise of the yoke region 16, serves to more evenly guide the yoke terminals through the barrels 14 without cocking and at the minimum of frictional drag. For present purposes, the inclined links never assume parallelism.

It will be evident that by gripping both spread pieces 24 between the fingers, each link may be shifted from its A—B position into its C—D position and thereby extend my framework. The inclination in either extreme manipulative position is such as to remain freely operative without allowing the toggle link to interlock itself, hence the raised lenses may be deliberately lowered by pressing a finger downwardly upon the bridge crown and toward the respective nose pads. The inner portion of each upper slot edge may be shaped to provide for a well rounded offset or latch indentation such as 26 which is designed to receive the movable shank of the finger piece and thereby retain the raised lenses against inadvertent release. The effective slot travel allowed for each of the finger pieces may be made substantially equal to the extensible lift imparted to the bridge piece.

The same underlying principle is subject to various modifications and while balanced links are preferred, the use of but a single link may also be made to bring about a similar result. Accordingly, reference is had to Figs. 4 and 5, in which alternative structure the aforesaid bridge slots are now replaced by oppositely disposed crosshead means such as the slidable complementary sleeves 30 and 31 arranged to embrace the elongated bridge crown 32 so as to move toward and away from each other. The rear face of each such sleeve carries a fulcrum pin such as 33 upon which is mounted one of the inclined togglelike links 34 or 35 so as to slidably adjoin both outer link ends to the crown of the bridge piece. The opposite convergent link ends are again pivoted at 36 and 37 to the medial region of the guided yoke 38 having nose pads such as 39 mounted thereon.

Said sleeves may respectively be equipped with forwardly extending finger pieces such as 40 represented in dotted outline in Fig. 5, when the action remains identical with that previously described in connection with the Figs. 1 to 3 disclosure. However, while not representing a preferred mode of operation, the links 34 and 35 may also be actuated by other supplementary means, such as the use of a right and left hand screw or the like adjustable interlocking means 41 having a manipulative disc 42 interposed between the ends thereof as detailed in Figs. 4 and 5. Each sleeve may then be provided with an upstanding nut such as 43 and 44, so that when rotating said disc in one or the other direction, it will correspondingly cause the framework to be positively collapsed or extended between appropriate stop means. These screw threads are preferably so arranged that the knurled rim of the disc 42 turns over and downwardly toward the nose pads in order to lower the lenses.

It is emphasized that the divergent ends of my inclined links need not both be rendered slidable. As an instance of such exemplification, Fig. 6 discloses still another link hook up in which the bridge or arch crown region 50 is embraced by one or more sleeves such as 51 and 52. The medial region 53 of the shiftable yoke member may again be flattened and mounts a tubular slide collar 54 therearound. This collar may be provided with a pair of forwardly directed fulcrum pins such as 55 and 56 while each of the sleeves are respectively shown equipped with similar rearwardly directed fulcrum pins, namely 57 and 58. Reversely inclined toggle links 59 and 60 are respectively carried between the pivots 55—57 and 56—58.

Each such sleeve may afford an upstanding finger piece or the like manipulative button such as 61. The sleeve 51 may further be provided with an overhanging stop lug 62 and this sleeve is intended to be fixedly held in place by a dowel 63 or the like. Then by squeezing the finger pieces toward each other the sleeve 52 will be laterally shifted inwardly toward its retained mate 51 into its dotted position 52', which in turn will cause the collar 54 to slide along the yoke region 53 and thereby raise the bridge crown relative to the twin nose pads carried by the terminals of the yoke. The links 59 and 60 are now thrown into their depending dotted center line position so as to sustain the bridge weight, but allowing the frame to be collapsed when the extended bridge of the worn glasses is pressed downwardly by a superior finger force.

The use of twin fulcrum pins 55 and 56 permits the links 59 and 60 to be symmetrically interposed between the yoke and the rear of the bridge crown, although the convergent link ends might likewise be made to turn about a common pintle. Like toggle results may be attained by the use of a bell crank lever that is medially attached to my yoke and has a cooperating link associated with a free end thereof to become operatively adjoined to the slidable collar 54.

It is thought the foregoing specification is sufficiently comprehensive to make evident how to fabricate and manipulate my improved extensible eyeglass frames. Other inherent advantages are believed to be apparent to those skilled in this art, it being understood that I reserve the right to modify the structural elements of my illustrative embodiments to meet commercial requirements, all without departing from the spirit and scope of my invention heretofore described and more particularly pointed out in the appended claims.

I claim:

1. In eyeglasses comprising a pair of multifocal lenses substantially lying in a common plane, the combination of a sectional lens interconnecting framework of which one component comprises a U-shaped bridge piece including an elongated crown region having leg ends depending therefrom and which legs each fixedly mount lens receiving means together with a guideway substantially aligning with the aforesaid plane, and which other component comprises a cooperative yoke having a medial region and which yoke is slidably mounted in the respective guideways, said frame components being shiftably assembled to move between extended and collapsed positions, a separate nose pad carried by each yoke terminal region, a pair of reversely inclined links having their respective convergent ends adjoined to said medial yoke region with one of the divergent link ends shiftably mounted to slide lengthwise of the bridge crown region, and manipulative means for shifting said one divergent link end toward the other and thereby bringing the frame components from collapsed into extended position.

2. In eyeglasses comprising a pair of multifocal lenses substantially lying in a common plane, the combination of a sectional lens interconnecting framework of which one component comprises a U-shaped bridge piece including an elongated crown region having leg ends depending therefrom and which legs each fixedly mount lens receiving means together with a guideway substantially aligning with the aforesaid plane, and which other component comprises a cooperative yoke having a medial region and which yoke is slidably mounted in the respective guideways, said frame components being shiftably assembled to move between extended and collapsed positions, a separate nose pad carried by each yoke terminal region, and an inclined link having one end adjoined to said medial yoke region and the other end shiftably mounted to slide lengthwise of the bridge crown region to change the link inclination, said link serving to positively actuate the frame components from collapsed into extended position and which link may be returned into its initial inclination by pressing the bridge crown toward the nose piece while the eyeglasses are operatively worn.

3. In eyeglasses comprising a pair of multifocal lenses substantially lying in a common plane, the combination of a sectional lens interconnecting framework of which one component comprises a U-shaped bridge piece including an elongated crown region provided with complementary guide slots therethrough in tandem relationship, said bridge piece further including depending leg ends each serving to fixedly mount lens receiving means together with a guideway substantially aligning with the aforesaid plane, and the other component comprises a cooperative yoke having a medial region and which yoke is slidably mounted in the respective guideways, said frame components being shiftably assembled to move between extended and collapsed positions, a separate nose pad carried by each yoke terminal region, a pair of reversely inclined links having the respective convergent ends pivoted to said medial yoke region, and manipulative means including a separate finger piece freely extending through each of the bridge slots, the respective divergent link ends being pivotally attached to a finger piece and which finger pieces when gripped inwardly toward each other serve to extend the frame components from their collapsed position.

4. In eyeglasses comprising a pair of multifocal lenses substantially lying in a common plane, the combination of a sectional lens interconnecting framework of which one component comprises a U-shaped bridge piece including an elongated crown region having leg ends depending therefrom and which legs each fixedly mount lens receiving means together with a guideway substantially aligning with the aforesaid plane, and which other component comprises a cooperative yoke having a medial region and which yoke is slidably mounted in the respective guideways, said frame components being shiftably assembled to move between extended and collapsed positions, a separate nose pad carried by each yoke terminal region, crosshead means disposed to shift lengthwise of the elongated crown region of the bridge piece, and a link having one end adjoined to said medial yoke region and the other end pivoted to such crosshead means, said crosshead means when shifted serving to bring the frame components from collapsed into extended position.

5. In eyeglasses comprising a pair of multifocal lenses substantially lying in a common plane, the combination of a sectional lens interconnecting framework of which one component comprises a U-shaped bridge piece including an elongated crown region having leg ends depending therefrom and which legs each mount lens receiving means together with a guideway substantially aligning with the aforesaid plane, and which other component comprises a cooperative yoke having a medial region and which yoke is slidably mounted in the respective guideways, said frame components being shiftably assembled to move between extended and collapsed positions, a separate nose pad carried by each yoke terminal region, complementary crosshead means disposed to shift lengthwise of the elongated crown region of the bridge piece toward and away from each other, a pair of reversely inclined links having their respective convergent ends pivoted to said medial yoke region and their divergent ends respectively adjoined to each such crosshead means, and adjustable interlocking means serving to change the spacing between the complementary crosshead means.

6. In eyeglasses comprising a pair of multifocal lenses substantially lying in a common plane, the combination of a sectional lens interconnecting framework of which one component comprises a U-shaped bridge piece including an elongated crown region having leg ends depending therefrom and which legs each mount lens receiving means together with a guideway substantially aligning with the aforesaid plane, and which other component comprises a cooperative yoke having a medial region and which yoke is slidably mounted in the respective guideways, said frame components being shiftably assembled to move between extended and collapsed positions, a separate nose pad carried by each yoke terminal region, fulcrum collar means slidable lengthwise of said medial yoke region, and a pair of reversely inclined links having their respective convergent end regions operatively adjoined to said collar means and one of their divergent ends shiftably adjoined to slide lengthwise of the bridge crown region and the other divergent link end is fixedly pivoted to the bridge piece, the aforesaid one divergent link end when shifted toward the other divergent link end serving to bring the frame components from collapsed into extended position.

7. In eyeglasses comprising a pair of multifocal lenses substantially lying in a common plane, the combination of a sectional lens interconnecting framework of which one component comprises a U-shaped bridge piece including an elongated crown region having leg ends depending therefrom and which legs each mount lens receiving means together with a guideway substantially aligning with the aforesaid plane, and which other component comprises a cooperative yoke having a medial region and which yoke is slidably mounted in the respective guideways behind said bridge piece in laterally spaced relation, said frame components being shiftably assembled to move between extended and collapsed positions, a separate nose pad carried by each yoke terminal region, and a pair of reversely inclined links having their respective convergent ends adjoined to said medial yoke region and one of their respective divergent ends shiftably adjoined to slide lengthwise of the bridge crown region, said links serving to positively actuate the frame components from collapsed into extended position and being operatively interposed between the bridge crown region and said spaced yoke.

8. In eyeglasses comprising a pair of multifocal lenses substantially lying in a common plane, the combination of a sectional lens interconnecting framework of which one component comprises a U-shaped bridge piece including an elongated crown region having a bridge slot therethrough provided with a latch indentation at one slot end, said bridge piece further including depending leg ends each serving to fixedly mount lens receiving means together with a guideway substantially aligning with the aforesaid plane, and the other component comprises a cooperative yoke having a medial region and which yoke is slidably mounted in the respective guideways, said frame components being shiftably assembled to move between extended and collapsed positions, a separate nose pad carried by each yoke terminal region, an inclined link having the one end adjoined to said medial yoke region, and manipulative means including a movable finger piece freely extending through said bridge slot, the other end of such link being attached to the finger piece and which finger piece when moved toward the aforesaid one slot end serves to extend the frame components from their collapsed position and which link is then releasably retained by the latch indentation.

9. In eyeglasses comprising a pair of multifocal lenses substantially lying in a common plane, the combination of a sectional lens interconnecting framework of which one component comprises a U-shaped bridge piece including an elongated crown region having a forwardly extending obtuse nose shape with legs depending from the ends thereof and which legs each fixedly mount lens receiving means together with a guideway aligning with the aforesaid plane, and another component of which frame comprises a cooperative yoke having a medial region shaped to correspond with said nose and which yoke is slidably mounted in the respective guideways, said frame components being shiftably assembled to move between extended and collapsed positions, a separate nose pad carried by each yoke terminal region, complementary crosshead means disposed to shift lengthwise of the elongated crown region of the bridge piece toward and away from each other, and a pair of reversely inclined links having their respective convergent ends pivoted to said medial yoke region and their respective divergent ends pivotally adjoined to the bridge crown region in opposed relation to the nose thereof, the axes of the respective pivots of each such link being kept in parallelism.

10. In eyeglasses comprising a pair of multifocal lenses substantially lying in a common plane, the combination of a sectional lens interconnecting framework of which one component comprises a U-shaped bridge piece including an elongated crown region having leg ends depending therefrom and which legs each mount lens receiving means together with a guideway substantially aligning with the aforesaid plane, and which other component comprises a cooperative yoke having a medial region and which yoke is slidably mounted in the respective guideways, said frame components being shiftably assembled to move between extended and collapsed positions, a separate nose pad carried by each yoke terminal region, manipulative crosshead means disposed to shift lengthwise of the elongated crown region of the bridge piece, and an inclined link having one end pivotally adjoined to said medial yoke region and the other end pivoted to such crosshead means and which means serves as a centralized control for positively extending or collapsing the bridge piece with respect to the complementary nose pads.

GEORGE W. BAILEY.